P. W. ANDERSON & J. T. KENNELLY.
DETACHABLE TIRE.
APPLICATION FILED OCT. 14, 1914.
1,216,916.  Patented Feb. 20, 1917.
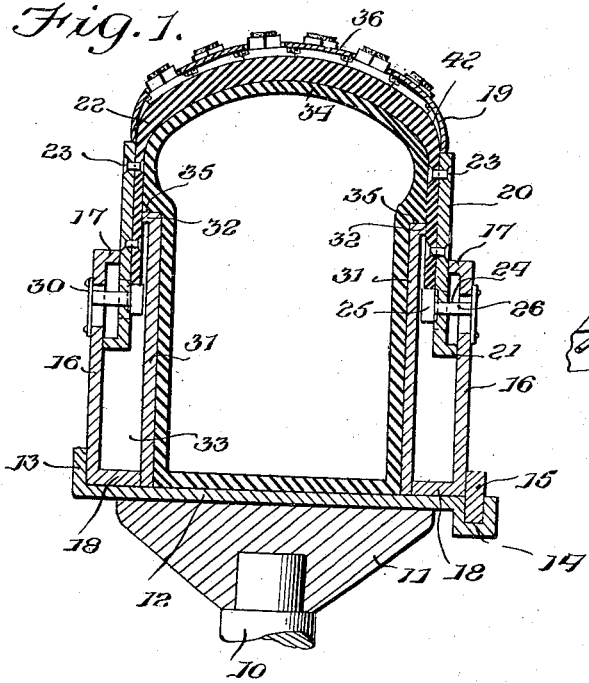
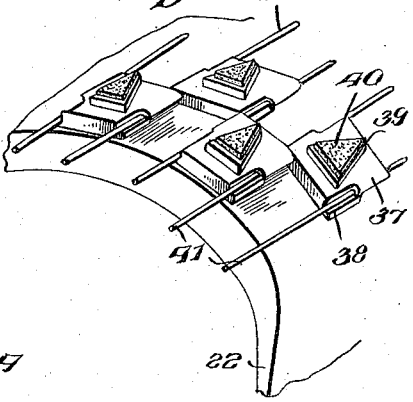
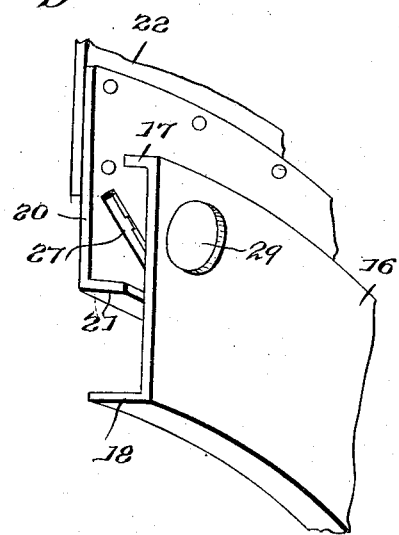
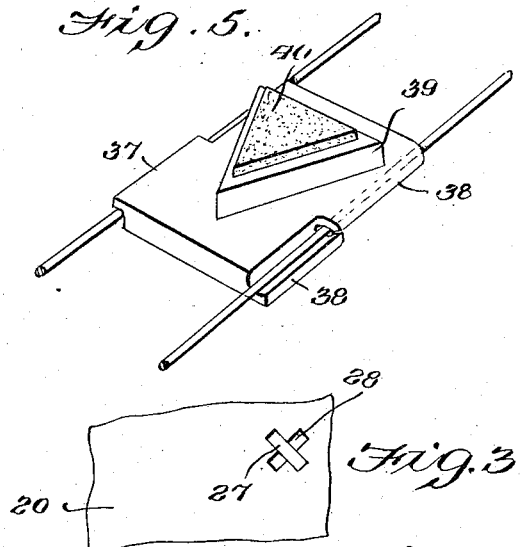
Inventors
P. W. Anderson
J. T. Kennelly
By _____ Attorney
Witnesses

UNITED STATES PATENT OFFICE.

PETER W. ANDERSON AND JOSEPH T. KENNELLY, OF RAWLINS, WYOMING.

DETACHABLE TIRE.

1,216,916.   Specification of Letters Patent.   Patented Feb. 20, 1917.

Application filed October 14, 1914. Serial No. 866,664.

*To all whom it may concern:*

Be it known that we, PETER W. ANDERSON and JOSEPH T. KENNELLY, citizens of the United States, residing at Rawlins, in the county of Carbon and State of Wyoming, have invented certain new and useful Improvements in Detachable Tires, of which the following is a specification.

This invention relates to certain new and useful improvements in detachable tires, and has as its primary object to provide a device of this character which will be simple in construction and wherein the detaching of the tire from the wheel rim may be easily effected, and wherein the tire may be attached to the rim with equal facility.

The invention has as a further object to provide a construction wherein but a single fastening means will be employed upon each side of the tire for holding the tread thereof in proper operative position upon the rim, and wherein, by the release of said fastening means, the tire may be detached from the rim.

A further object of the invention is to provide an improved tire wherein the inner tube carried thereby will be thoroughly protected and wherein the shoe, in its radial movement, will not come in contact with the inner portion of the inner tube or the portion thereof adjacent the rim.

The invention has as a still further object to provide an armor for the shoe which may be readily attached thereto and which will efficiently protect the shoe to prolong the usefulness thereof.

And a still further object of the invention is to provide a construction wherein the said armor will form an anti-skidding device for the tire.

With these and other objects in view, my invention will be more fully described illustrated in the accompanying drawings, and then specifically pointed out in the claims which are attached to and form a part of this application.

In the accompanying drawings:—

Figure 1 is a transverse sectional view showing my improved tire mounted upon a wheel rim, Fig. 2 is a fragmentary perspective view particularly illustrating the slots formed in the side portions of the shoe and in the outer clamping members through which fastening devices are disposed to extend for operatively connecting the shoe with the rim, Fig. 3 is a fragmentary side elevation showing the seats or recesses formed in the inner faces of the side portions of the shoe in which the fastening devices are disposed to engage, Fig. 4 is a fragmentary perspective view of the armor employed, said armor being illustrated in position upon the tread of the tire, and Fig. 5 is a detail perspective view of one of the armor sections.

Corresponding and like parts are referred to in the following description and indicated in all the views of the drawing by the same reference characters.

Referring more particularly to the drawing, we have illustrated in Fig. 1 thereof, our improved tire mounted in operative position, wherein the numeral 10 designates the spoke of a wheel, 11, the felly, and 12, the rim, said rim being provided, upon one side, with an annular upstanding flange 13, and upon its opposite side, with a channel 14, disposed to receive a locking ring 15, this construction being conventionally illustrated.

Coming now more particularly to the subject of the present invention, we employ outer side members or rings 16 which are detachably mounted upon the rim 12, each of said side members being provided with terminal laterally extending flanges 17 and 18. The flange 18 of each of said members is longer than the flange 17 thereof, and is disposed to seat against the rim 12.

Mounted for radial movement upon the side members 16, is the shoe, which is designated as a whole at 19. More particularly, the said shoe includes the side members or rings 20 which are each provided at one extremity, with a terminal laterally extending flange 21, disposed to abut the flange 17 of the side members 16, and it will be observed that the flanges 21 are of equal length with the flanges 17.

Connected to the side members or rings 20, adjacent the outer margin thereof, is a flexible tread 22, the said tread being bolted or otherwise secured to the side members 20, as shown at 23. Preferably, the tread 22 is relatively thick as shown, and may be formed of rubber, leather or any other suitable material.

Operatively connecting the rings 20 and the side members 16, are fastening devices or bolts 24, the said bolts each being formed with a head 25 and a preferably circular shank 26. Formed in the rings 20 upon one side of each thereof and adjacent the flanges 21, are obliquely arranged slots 27, and formed in the inner faces of the said rings and intersecting the slots 27, at substantially right angles thereto, as best shown in Fig. 5 of the drawings, are recesses or seats 28. The side members 16, upon one side of each thereof, are provided with radial slots 29.

In arranging the side members 16 upon the rim 12, the slots 29 thereof, are brought opposite the slots 27 formed in the rings 20 of the shoe. One of the bolts 24 is then passed through the said slots upon each side of the tire by inserting the head 25 thereof, first through the slot 29 and then through the slot 27, the bolt being rotated slightly after having been passed through the slot 29 so as to bring the head 25 thereof in alinement with the adjacent slot 27. The bolt is then again rotated so that the head 25 thereof will engage within the adjacent seat or recess 28 formed in the contiguous ring 20, the said seats or recesses being of such depth as to firmly engage the side faces of the heads of said bolts. It will be observed that the bolts 24 will be securely supported upon the rings 20, and as best shown in Fig. 1 of the drawing, the shanks 26 of said bolts are of such length as to terminate in alinement with the outer faces of the side members 16. After so inserting the bolts, plates 30 are preferably secured to the outer faces of the side members 16, the said plates being disposed to cover the slots 29. In this connection, it is pointed out that the slots 29 are of a width to freely receive the shanks of the bolts 24 so that there will be no binding between the members such as would interfere with proper eccentric movement of the rings 20 upon the wheel.

Arranged within the side members 16 are inner protecting rings or members 31, the said rings resting at one edge, upon the flange 12 and being disposed to abut the outer extremities of the flanges 18 of said side members. At their outer edges, the rings 31 are provided with laterally extending flanges 32 which are disposed to abut the inner faces of the sides of the shoe.

By this arrangement, it will be observed that annular recesses 33 are provided upon each side of the tire between the side members 16 and the inner protecting rings 31. As will be seen, upon reference to Fig. 1 of the drawings, radial movement of the shoe 19 will cause the rings 20 to move vertically within the recesses 33, the shanks 27 of the bolts 25 also moving vertically within the slots 29, and in the provision of the said recesses, it will be observed that the movement of the said rings 20 will, at all times, be unobstructed.

Arranged within the inner protecting rings 31 and disposed to contact with the inner face of the tread 19 is the inner tube 34. The said inner tube may be formed of rubber or a composition of rubber and any other suitable material, and the inner portions thereof or the portion contacting with the protecting rings 31 may be made relatively light, since the side portions of the tube will be supported, at all times, by said protecting rings. However, the outer portion of the tube is preferably constructed heavier relatively, than the inner portion and is provided, upon each side, with annular shoulders 35, which are disposed to extend laterally over the upper extremities of the protecting rings 31, the flanges 32 of the said rings providing shoulders against which the shoulders 35 may seat.

It will be observed that the inner tube 34 will be supported radially by the shoulders 35, and consequently, since the said shoulders are arranged adjacent the periphery of the tube, the greater portion of the load upon the inner tube will be supported by the said shoulders and by the protecting rings 31. This is a very advantageous construction since the life of the inner tube will thus be greatly prolonged.

Attention is now called to the fact that when the inner tube 34 is inflated, the said tube will maintain the protecting rings 31 in such position, that the flanges 32 will operatively bear against the inner faces of the rings 20 of the shoe, while the flanges 18 of the side members 16 will engage the said rings adjacent the rim 12. The said rings will thus be held in operative position within the tire and it will be observed that the said rings are disposed to confront the head 25 of the bolts 24. Since said bolts 24 can only be removed by first moving the said bolts inwardly toward the protecting rings 31 to disengage the heads thereof from within the seats 28, it will be observed that the said bolts will be held in operative engagement within the said seats by the protecting rings 31. Furthermore, any possibility of the accidental displacement of the bolts 24 is thus overcome.

It will be seen upon reference to Fig. 1 of the drawings, that the shoe 19 in its radial movement, cannot contact frictionally with the side portions of the inner tube owing to the presence of the protecting rings 31, the said rings forming a housing for the inner portion of the inner tube 34 so that the side members or rings 20 of the shoe, as well as the bolts 24, cannot come in contact with the side walls thereof.

In assembling the tire upon the rim 12, one side member 16 is first positioned thereon, to abut the flange 13, as shown in Fig. 1 of the drawing. The adjacent side member or ring 20 of the shoe is then operatively connected with the said side member and one of the bolts 24 is then inserted within the contiguous slots 27 and 29, as heretofore described. One of the protecting rings 31 is then positioned upon the rim 12 with the flange 32 thereof confronting the adjacent side member 20 of the shoe. The inner tube 34 may then be positioned within the shoe 19 and the other protecting ring 31 is then positioned upon the rim 12. The contiguous side member or ring 20 of the shoe is then arranged to confront the said last mentioned protecting ring, when the other side member 16 may be positioned upon the rim and the other bolt 24 inserted within the contiguous slots 27 and 29, to operatively connect the said side member with the contiguous ring 20 of the shoe. The locking ring 15 is then disposed within the channel 14 to maintain the several parts in position upon the rim and upon the inflation of the inner tube, the said protecting rings 31 will be forced outwardly into operative engagement with the rings 20 of the shoe and with the side members 16 to maintain the bolts 24 in operative position within the said slots.

Arranged upon the outer face of the tread 22 and extending entirely around the said tread, is an armor 36. The armor 36 includes a plurality of sections or plates 37 which are each preferably formed of suitable resilient sheet metal, and which are each provided upon the longitudinal edges thereof, with laterally projecting and reversely arranged opposed flanges 38. Medially formed upon one side face of each of the plates 37 is an upstanding and preferably triangular shaped boss 39 defining a knob receiving pocket and disposed in said pocket and engaged with the said boss, is a resilient knob 40. The knobs 40 may be formed of any suitable resilient material and are disposed for frictional engagement within the pockets formed by the bosses 39.

In assembling the plates 37 to form the armor, the said plates are arranged in staggered relation as best shown in Fig. 4 of the drawings, with the flanges thereof in alinement and a plurality of members or wires 41 are engaged with the flanges of the several members as illustrated in Fig. 5 of the drawings, by passing the said wires over and under the opposed flanges upon each side of each of said plates, it being understood that the wires or members 41 extend around the tread 22 throughout the entire circumference thereof and are thus disposed to hold the members 37 seated upon the tread with the knobs 40 thereof projecting radially.

Bearing over the members 37 when thus arranged upon the tread is an annular band which is preferably formed from suitable resilient sheet metal and which is provided with suitable apertures to receive the bosses 39 formed on the said members. In this manner, the members 37 are held firmly against the outer face of the tread 22 while the band 42 will, under ordinary circumstances prevent the possible puncturing of the tire.

As will be readily understood, a load upon the tire will have a tendency to compress the knobs 40 within the bosses 39 so that the outer edges of the said bosses will contact with the surface over which the tire is passing to thus in effect, provide anti-skidding devices. Obviously, this is a feature of advantage since, in wet weather, the use of chains now commonly employed, will not be required.

It will therefore be seen that we provide a very simple and efficient construction for the purpose set forth, wherein the tire may be readily attached to or detached from the wheel rim and wherein the said tire is adapted for use upon the conventional type of wheel rim as now in common use, wherein a locking ring is employed. It will also be seen that we provide a tire which, while possessing the resilient qualities of the conventional form of pneumatic tire, is, nevertheless, so constructed as to be much more durable in use, and wherein the inner tube carried by the tire will be effectually protected, both as against wear due to the radial movement of the tire shoe in use, and as against possible puncture. It will further be seen that but a single fastening means is employed upon each side of the tire for maintaining the several parts thereof in operative engagement with each other and that each of the said fastening means may be readily removed to effect the dismounting of the tire.

Having thus described our invention, what we claim and desire to secure by Letters Patent is:—

1. The combination with a wheel rim having an upstanding flange formed thereon and provided with a locking ring, of side members mounted upon the rim and disposed for engagement between said flange and locking ring, protecting plates arranged to confront the inner faces of said members, a shoe including side portions movable between the side members and the protecting plates, and means operatively connecting the side portions of the shoe and said side members.

2. A tire including side members, protecting plates inwardly spaced from the side members and each operatively engaging at one margin thereof with the said members, a shoe including side portions movable between the side members and the protecting plates with the said plates engaging the inner faces of the side portions of the shoe, and means operatively connecting the side portions of the shoe and said members.

3. A tire including side members having marginal inner and outer flanges formed thereon, protecting plates inwardly spaced with respect to said side members and provided with outer marginal flanges with the inner margins of said plates engaging the inner marginal flanges of said side members, a shoe including side portions having outer marginal flanges engaging the inner faces of said side members with the outer marginal flanges of the side members and of the plates engaging opposite side faces of the side portions of the shoe, and means operatively connecting said side members and the side portions of the shoe.

4. A tire including side members having inner and outer marginal flanges formed thereon with the inner flanges of greater length than the outer flanges, protecting plates inwardly spaced with respect to said side members and having outer marginal flanges formed thereon with the inner margins of said plates engaging the inner marginal flanges of said side members, a shoe including side portions received between the said side members and the protecting plates and provided with outer marginal flanges engaging the inner faces of said side members with the outer marginal flanges of the side members and of the plates engaging opposite side faces of the side portions of the shoe, and means operatively connecting said side members and the side portions of the shoe.

5. A tire including side members provided with flanges, protecting plates inwardly spaced with respect to the side members by the said flanges to provide annular recesses between the protecting plates and the said members, a shoe including side portions movable within said recesses, and means operatively connecting the side portions of the shoe and said side members.

6. A tire including side members, a shoe including side portions arranged to confront the inner faces of said side members, means operatively connecting the side members and the side portions of the shoe, and protecting plates operatively engaging the said side members and confronting the inner face of the side portions of the shoe.

7. A tire including side members, a shoe including side portions operatively connected to said side members, protecting plates confronting the inner faces of said side portions of the shoe and providing shoulders at their outer margins, and an inner tube arranged between said plates to engage said shoulders.

8. A tire including side members, rigid protecting plates inwardly spaced with respect to said side members, a shoe having a flexible tread provided with rigid side portions movable between said side members and protecting plates, and means operatively connecting said side portions of the shoe and said side members.

9. A tire including side members having openings formed therein, a shoe including side portions arranged to confront the inner faces of said side members and provided with slots confronting said openings, recesses formed in the inner faces of said side portions and intersecting said slots, and bolts having heads seating in said recesses with the shanks of the bolts extending through said slots into the said openings for connecting the shoe with said side members.

10. A tire including side members free with respect to each other and adapted to be received upon a wheel rim to be operatively connected thereto, a shoe having side portions received between the said side members and movable with respect thereto, and means operatively connecting the side portions of the shoe and said side members.

In testimony whereof we affix our signatures in presence of two witnesses.

PETER W. ANDERSON. [L. S.]
JOSEPH T. KENNELLY. [L. S.]

Witnesses:
C. H. ANDERSON,
FRED KELLY.

Copies of this patent may be obtained for five cents each, by addressing the "Commissioner of Patents, Washington, D. C."